(12) United States Patent
Ebner et al.

(10) Patent No.: US 8,458,979 B2
(45) Date of Patent: Jun. 11, 2013

(54) INTERIOR PANEL ATTACHMENT SYSTEM

(75) Inventors: James E. Ebner, Stevens, WA (US); Greg A. Tubbs, Marysville, WA (US)

(73) Assignee: The Boeing Company, Chicago, IL (US)

(*) Notice: Subject to any disclaimer, the term of this patent is extended or adjusted under 35 U.S.C. 154(b) by 404 days.

(21) Appl. No.: 12/407,023

(22) Filed: Mar. 19, 2009

(65) Prior Publication Data
US 2009/0179111 A1 Jul. 16, 2009

Related U.S. Application Data

(62) Division of application No. 11/400,398, filed on Apr. 6, 2006, now Pat. No. 7,527,223.

(51) Int. Cl.
*E04B 2/00* (2006.01)
*B64C 1/06* (2006.01)

(52) U.S. Cl.
USPC ............. 52/582.2; 52/745.05; 24/581.11; 24/458; 24/702; 24/669

(58) Field of Classification Search
USPC ............. 244/129.1, 161, 177 R, 119, 120, 244/118.1, 118.2, 118.5, 118.6; 52/285.1, 52/285.3, 582.1, 582.2, 745.05; 24/522, 289, 24/297, 453, 697.1, 701, 702, 581.11, 458, 24/669, 573.09, 666; 248/314, 229.12, 229.22; 292/288; 403/353; 296/146.7, 1.08, 214
See application file for complete search history.

(56) References Cited

U.S. PATENT DOCUMENTS

| | | | |
|---|---|---|---|
| 3,160,280 A | 12/1964 | Burch | |
| 3,351,212 A * | 11/1967 | McConnell | 211/192 |
| 3,528,165 A * | 9/1970 | Abbott et al. | 228/111 |
| 3,849,012 A * | 11/1974 | Krouse | 403/188 |
| 5,485,932 A * | 1/1996 | Romm et al. | 211/87.01 |
| 5,518,208 A * | 5/1996 | Roseburg | 244/132 |
| 5,624,045 A * | 4/1997 | Highsmith et al. | 211/192 |
| 6,754,992 B1 * | 6/2004 | Byfield et al. | 52/36.5 |
| 6,766,984 B1 * | 7/2004 | Ochoa | 244/119 |
| 6,854,611 B2 * | 2/2005 | Powell | 211/192 |
| 6,871,822 B2 | 3/2005 | Guard | |
| 7,059,565 B2 * | 6/2006 | Scown et al. | 244/117 R |
| 7,178,855 B2 * | 2/2007 | Catron et al. | 296/146.7 |
| 2004/0139584 A1 | 7/2004 | Gibbons et al. | |
| 2005/0082431 A1 * | 4/2005 | Scown et al. | 244/119 |
| 2005/0111912 A1 * | 5/2005 | Brain et al. | 403/353 |
| 2006/0197356 A1 * | 9/2006 | Catron et al. | 296/146.7 |

FOREIGN PATENT DOCUMENTS

| | | |
|---|---|---|
| DE | 20308015 U1 | 9/2003 |
| JP | 7310382 A | 11/1995 |

* cited by examiner

*Primary Examiner* — Robert Canfield
*Assistant Examiner* — Jessie Fonseca
(74) *Attorney, Agent, or Firm* — Ostrager Chong Flaherty & Broitman P.C.

(57) ABSTRACT

An attachment system for coupling together two airplane sections includes an attachment section securing one of the airplane sections and a mount section affixed to the other section. The attachment section includes a top, a bottom, a first end, and a second end. Coupled to the top are two clamp sections, whereby at least one of the clamp sections is moveable. Coupled to the bottom is a pair of buttons. The mount section includes a top and a bottom, such that the mount bottom couples to the second airplane section. The mount section further includes a track coupled to the mount top, wherein the track includes an open end having outwardly tapered edges and a closed end. The one of the buttons slides into the track for coupling the attachment section to the mount section.

8 Claims, 6 Drawing Sheets

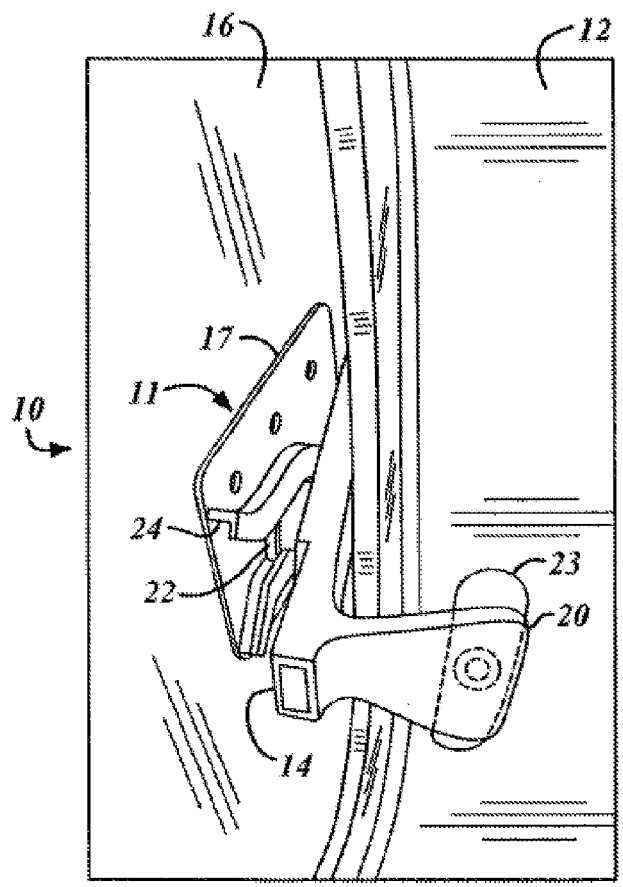
*FIG. 1*
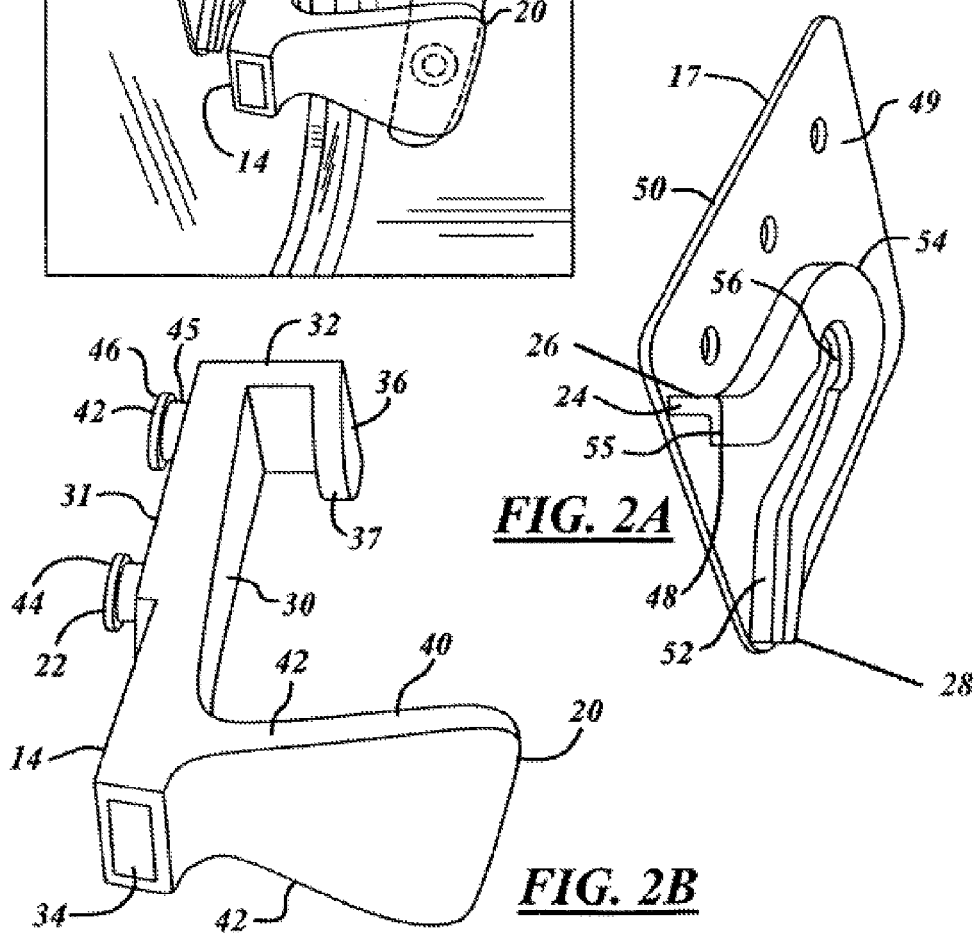
*FIG. 2A*
*FIG. 2B*

INTERIOR PANEL ATTACHMENT SYSTEM

CROSS REFERENCE TO RELATED APPLICATION

The present application is a divisional of U.S. application Ser. No. 11/400,398, filed Apr. 6, 2006, issued as U.S. Pat. No. 7,527,223, which is incorporated herein by reference.

BACKGROUND

1. Technical Field

The present disclosure relates generally to attachment systems and processes and is more specifically related to devices for the attachment of interior panels in airplanes.

2. Description of the Related Art

Current airplane systems and methods use threaded fasteners for attaching interior panels to an aircraft structure. These systems and methods require the use of torque driving tools and also normally require substantial adjustments (e.g. slotting of support brackets) to accommodate gap adjustment between the interior panels and aircraft structure. These adjustments generally consume a substantial amount of time in the installation of these airplane panels. Current methods also generally require expensive sheet metal brackets, which require substantial fabrication time and additional layers of finish for corrosion protection.

It is a constant goal to reduce labor hours required to install interior panels on airplanes. This often drives the need for a quick and easy panel fastening system and method that provides alignment capabilities with minimal or no adjustment requirements.

The disadvantages associated with current interior panel attachment systems made it apparent that a new and improved attachment system is needed. The new attachment system should reduce assembly time and provide indexing features that assist in guiding interior panels into place. It would also be desirable to provide an audible feature that allows a mechanic or installer to know when the panel is engaged. The present disclosure is directed to these ends.

SUMMARY

In accordance with one aspect of the present disclosure, an attachment system for coupling a first airplane section to a second airplane section includes an attachment section. The attachment section includes a top, a bottom, a first end, and a second end. Coupled to the top are a first clamp section and a second clamp section, whereby at least one of the first clamp section and the second clamp section are moveable, such that the attachment section secures the first airplane section between the first clamp section and the second clamp section. Coupled to the bottom is a first button. The attachment system includes a mount section including a top and a bottom, such that the mount bottom couples to the second airplane section. The mount section further includes a track coupled to the mount top, wherein the track includes an open end having outwardly tapered edges and a closed end. The first button slides into the track for coupling the attachment section to the mount section.

One advantage of the present disclosure is that airplane components may be quickly assembled due to the flared edges of the track allowing easy insertion of the button. Another advantage of the present disclosure is that, in one embodiment thereof, it provides an audible feed back system for verifying proper coupling of the attachment section and the mount section.

Additional advantages and features of the present disclosure will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the disclosure may be well understood, there will now be described some embodiments thereof, given by way of example, reference being made to the accompanying drawings, in which:

FIG. 1 illustrates an airplane system including an attachment system in accordance with one embodiment described in the disclosure;

FIG. 2A illustrates a perspective view of a mount section for the attachment system of FIG. 1;

FIG. 2B illustrates an attachment section for the attachment system of FIG. 1;

DETAILED DESCRIPTION

Figure 3:
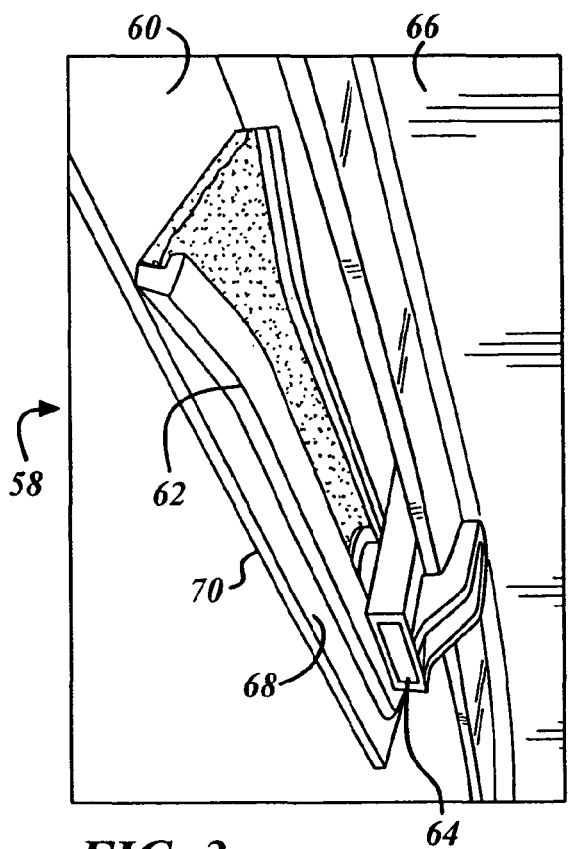
FIG. 3 illustrates an airplane system having an attachment system in accordance with another embodiment.

The present disclosure is illustrated with respect to an attachment system particularly suited to the aerospace field. The present disclosure is, however, applicable to various other uses that may require attachment systems, as will be understood by one skilled in the art.

In the following description, various operating parameters and components are described for a number of constructed embodiments. The specific parameters and components are included as examples and are not meant to be limiting.

Referring to FIG. 1, an airplane system 10 is illustrated including a first airplane section 12 and a second airplane section 16 coupled together through an attachment system 11. The attachment system 11 includes an attachment section 14 or sidewall bracket and a mount section 17. The airplane system 10 includes the first airplane section 12, such as a structural frame in a fuselage, having the first attachment section 14 coupled thereto. The first airplane section 12 is coupled to the second airplane section 16, such as an interior panel, through the mount section 17 coupled to the second airplane section 16.

Referring to FIGS. 1, 2A, and 2B, the attachment system 11 includes the attachment section 14 and the mount section 17. The attachment section 14 includes a top 30, a bottom 31, a first end 32, and a second end 34. Coupled at the top 30 in an area of the first end 32 is a hook 36 (included as an example of a first clamp section or a stabilizer feature and not meant to be limiting) having a prong portion 37 extending in a direction of the second end 34.

Coupled to the top 30 in an area of the second end 34 is a clamped tower 40 (second clamp section) such that an airplane section may be coupled between the hook 36 and the clamp tower 40. The clamp tower 40 is embodied extending perpendicular to the top 30 and having tapered sides 42. However, various other configurations of the clamp tower 40 are also contemplated in the present disclosure, such as a clamp tower having straight sides. Both the clamp tower 40 and the hook 36 may be positioned at any point on the top 30 depending on the type of airplane sections requiring coupling, and alternate embodiments include either or both of the hook 36 or the clamp tower 40 moveable with respect to the other.

Coupled to the bottom 31 are a first button 42 and a second button 44. Each button 42, 44 includes a base portion 45 and a button portion 46. The base portion 45 is embodied as cylindrical and extending past the edges 48 of a flange 55 of the track 24 when the button is slid therein.

The mount section 17 includes a top 49 and a bottom 50, such that the bottom 50 is bonded or mechanically fastened to the back of an airplane panel. Coupled to the top 49 is a track 24, wherein the track 24 includes an open end 52 having tapered edges 48 and a rounded closed end 54. Between the open end 52 and the closed end 54, ideally positioned closer to the closed end 54, is a narrow tapered portion 56 of the track 24, such that full insertion of a button into the track 24 provides audible feedback to the installer of the airplane sections as the button passes the tapered portion 56. The first button 42 is secured through a flange 55 of the track 24 extending inwardly. The flange is embodied as extending inwardly and around the track 24. Important to note is that the present disclosure also contemplates at least one other mount section for coupling to the attachment section 14 such that the second button 44 may fit therein in a similar manner as the first button 42 in the first mount section 17.

The attachment section 14 includes a clamping feature 20 for clamping the attachment section 14 to the airplane section 12. The attachment section 14 also includes at least one button head 22 such that the button head 22 slides into the mount section 17. The clamping feature 20 may be angled to accommodate the tapering of the fuselage at a front and an aft of the fuselage. The button 22 may be slightly spherical, spade-shaped, mushroom-shaped, and other shapes known in the art in order to aid in the installation of panels in a tapered section of the fuselage.

Between the clamping feature 20 and the airplane section 12 may be positioned a noise or vibration isolator mount 23. The isolator mount 23 may include a push-in fastener for coupling to an airplane section 12. The isolator mount may act as a fitting device for reducing potential movement of the attachment section 14.

The mount section 17 attaches to the back of an interior panel 16, this component includes a slotted track 24 that may be flared at ends thereof, left end 26, and right end 28, for providing easy alignment of the button head 22 into the slotted track 24. The track 24 may be oriented, and the button head 22 may engage the track 24 in any direction to accommodate a particular design application. For example, as in FIG. 3, a sidewall liner panel 60 may include a vertical and elongated track or mount section 62, and the clamp section 64 may hold an airplane panel 66. Important to notice that the interior panel attachment system may be made from light weight structural plastic thereby not requiring labor intensive fabrication of metallic brackets and reducing need for potentially corrosive components.

Figure 4A:
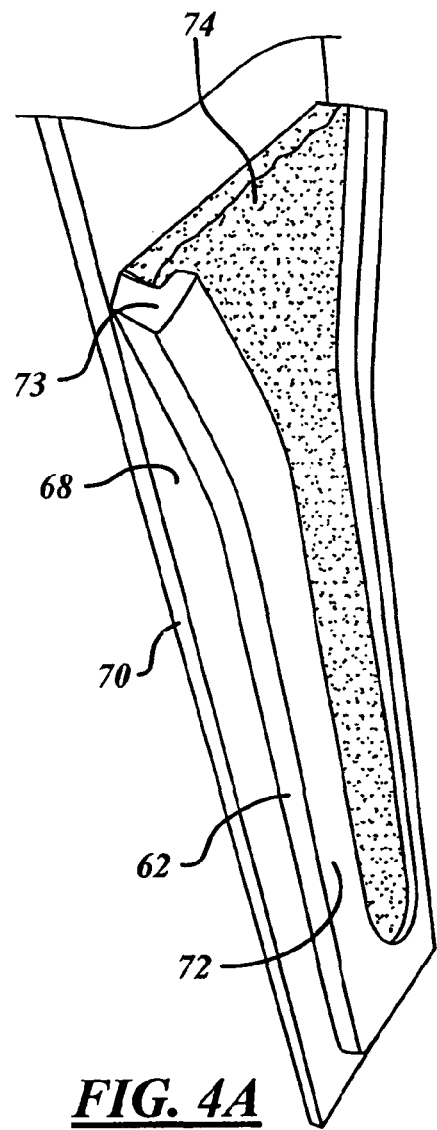
FIG. 4A illustrates a mount section in accordance with the attachment system of FIG. 3.
Figure 4B:
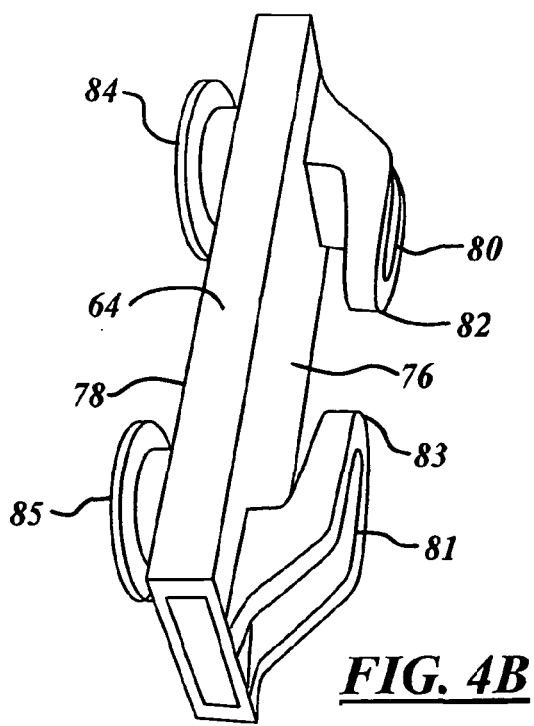
FIG. 4B illustrates an attachment section for the attachment system of FIG. 3.

Referring to FIGS. 3, 4A and 4B, an attachment system 58 is illustrated in accordance with another embodiment of the present disclosure. The mount section 62, which is bonded or mechanically fastened to the back of an interior panel 60, includes a top 68 and a bottom 70. Whereby the bottom 70 is coupled to the airplane panel 60. The top 68 includes an integral and an elongated track 72 having tapered ends 73 for receiving the buttons of the clamp section 64. Because the track 72 is elongated, a compressible material 74 is coupled along the length of the track 72 such that when the button of the clamp section is received therein, the compressible material 74 will resist movement of the clamp section.

The clamp section 64 includes a top 76 and a bottom 78. Coupled to the top are two hooks (first hook 80 and second hook 81) such that the prong portions 82, 83 of the hooks 80, 81 point towards each other. Coupled to the bottom 70 are a first button 84 and a second button 85 sized for reception within the track 72 (a first track for the first button and a second track on a second mount for the second button).

Figure 5B:
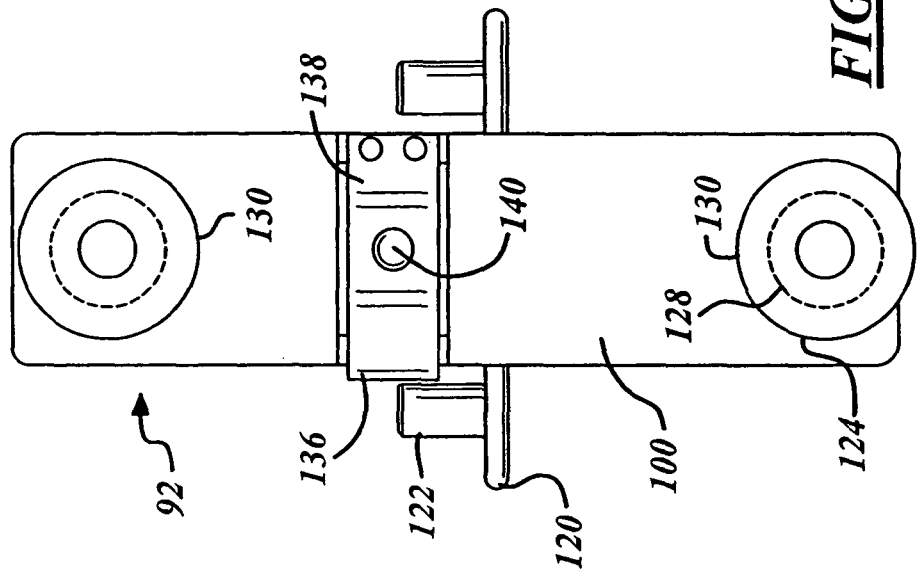
FIG. 5B illustrates a bottom view of the attachment system of FIG. 5A.
Figure 5A:
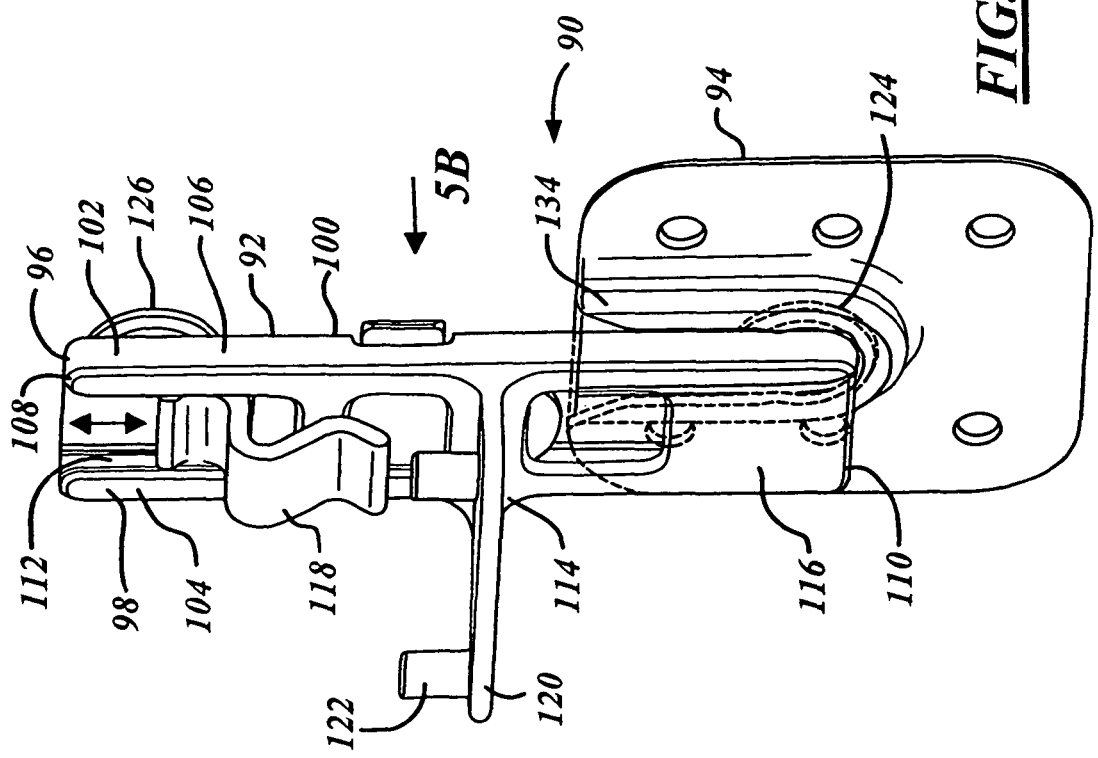
FIG. 5A illustrates a perspective view of an attachment system in accordance with another embodiment.
Figure 6:
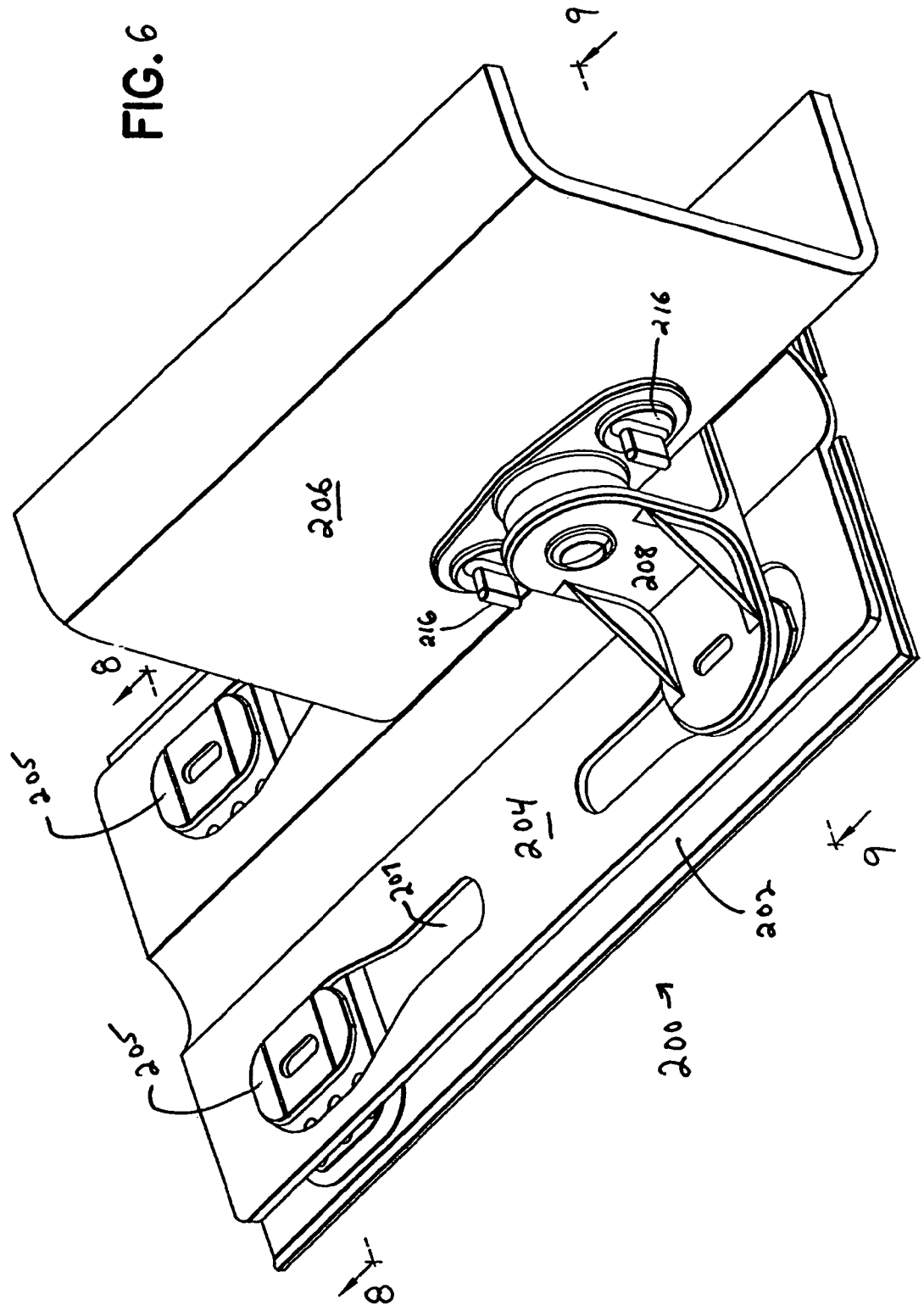
FIG. 6 illustrates a further embodiment of the airplane system having a mount section, a mounting assembly and an attachment section.
Figure 7:
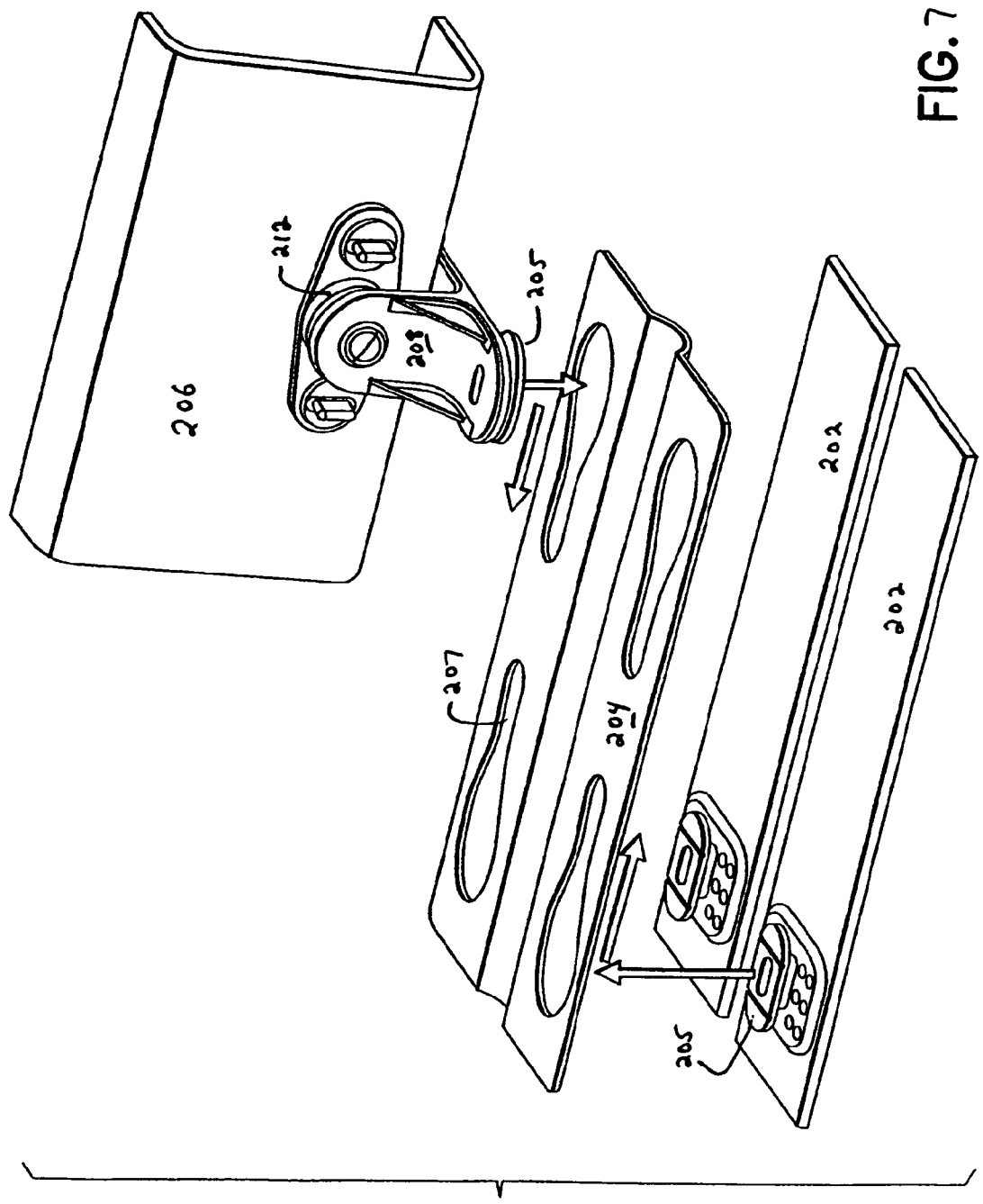
FIG. 7 illustrates the attachment system of FIG. 6 in disassembled form.
Figure 8:
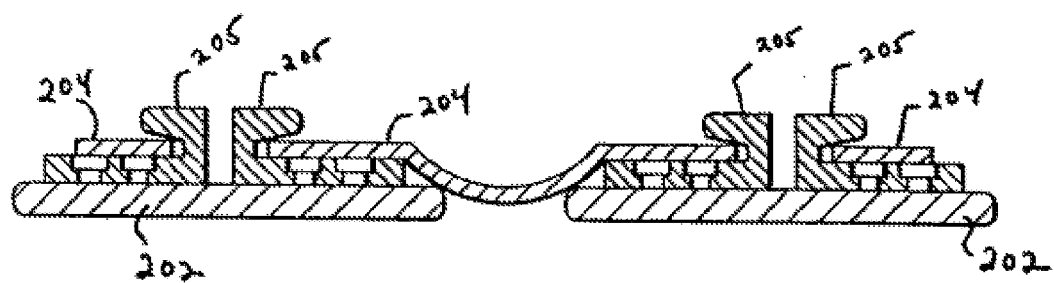
FIG. 8 illustrates a cross-section of the attachment system of FIG. 6.
Figure 9:
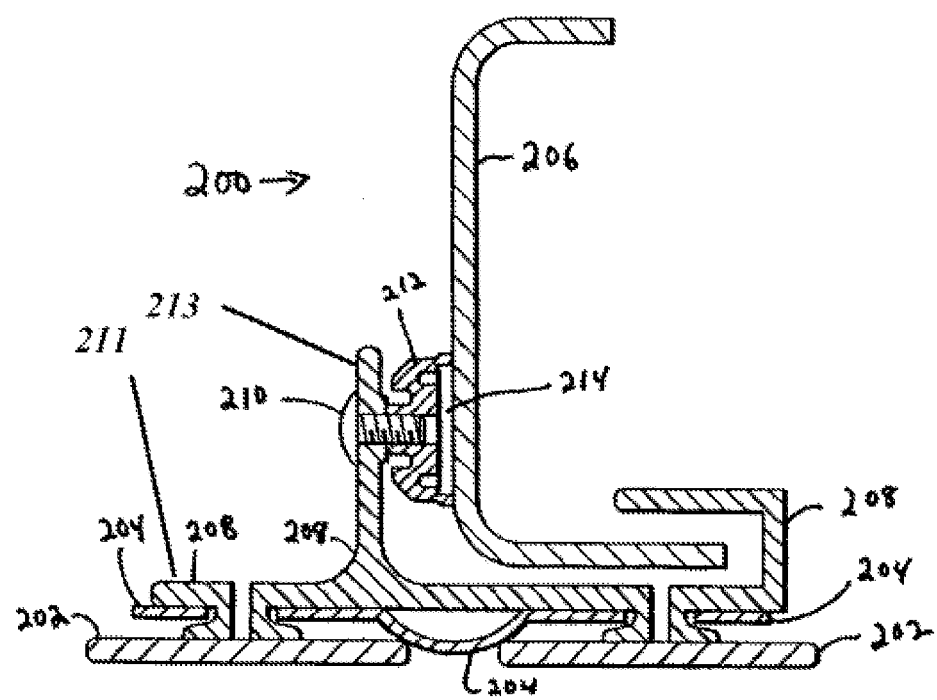
FIG. 9 illustrates a cross-section of the attachment system of FIG. 6.

Referring to FIGS. 5A and 5B, an attachment system 90 in accordance with another embodiment of the present disclosure is illustrated. The attachment system 90 includes an attachment section 92 slidably coupled to a mount section 94. The attachment section 92 includes a rectangular frame 96 having a top 98 a bottom 100, and a common edge 102, whereby the common edge 102 including a left portion 104, a right portion 106, a front portion 108, and a rear portion 110.

The top 98 includes a first end 112 near the front portion 108, a middle area 114 or tower area, and a second end 116 near the rear portion 110. Slidably coupled to the first end is a clamping feature 118 moveable from the first end 112 in a direction of the middle area 114. Coupled to the middle area 114 is a clamping tower 120 perpendicular or at an angle relative to the top 98. The clamping tower 120 includes indexing pins 122 received in holes in an airplane frame. The pins 122 point in a direction of the first end 112 such that an airplane component is clamped between the clamping tower 120, held in the index pins 122, and clamped at another end thereof through the clamping feature 118.

Coupled to the bottom 100 is a first button 124, and a second button 126 each of the buttons 124, 126, as discussed regarding previous embodiments include a base portion 128 and a button portion 130. As discussed earlier the base portion 128 extends such that the button portion 128 may slide within the track 134 of the mount section 94.

The attachment section 92 includes an indexing system 136 having a lock 138 coupled to the bottom 100 such that the lock engages one of a plurality of pins 140 of the clamped features 118. Thereby, the clamp feature 118 may be moved towards or away from the clamping tower 120 such that an airplane component may be clamped between the clamping tower 120 and the clamp feature 118.

FIGS. 6-9 illustrate another embodiment of the airplane system of the present disclosure. Multi-part panel attachment assembly 200 is comprised of a male keyway mounting means affixed to panel section 202. The male key is slidably coupled to female keyway mounting bracket 204, which serves as a panel gap cover, by means of a friction slide assembly utilizing button 205. Button means 205 is suitably engaged with tapered opening 207 of the keyway mounting bracket. Panel gap-covering mounting assembly 204 is further slidably coupled to frame attachment section 206 by coupling means 208. Coupling means 208 may be a fixed or adjustable mounting arm which is bonded or mechanically fastened to attachment section 206, as shown by fastener 210 which is secured to attachment means 212 and 214. Coupling means 208 may comprise a mounting member having a cross-bar 211 with one or more buttons and a vertical bar 213 coupled to the frame attachment section 206. Attachment section 206 may additionally utilize additional fasteners 216.

From the foregoing, it can be seen that there has been brought to the art a new and improved attachment system and method. It is to be understood that the preceding description of the preferred embodiment is merely illustrative of some of the many specific embodiments that represent applications of the principles of the present disclosure. Numerous and other arrangements would be evident to those skilled in the art without departing from the scope of the disclosure as defined by the following claims.

We claim:

1. An attachment system coupling a panel section to a frame attachment section, the panel section comprising a first elongated plate and a second elongated plate defining a linear gap therebetween, the attachment system comprising:
    a first mount coupled to the panel section, said first mount comprising a first male attachment member with a disc shaped head;
    a second mount coupled to the frame attachment section, said second mount comprising a second male attachment member with a disc shaped head coupled to a mounting member; and
    a female keyway mounting bracket having a first opening with a wide end and a tapered end, a second opening with a wide end and a tapered end, and a u-shaped section extending into said linear gap of said panel section;
    said first male attachment member and said second male attachment member inserted snugly into the tapered end of said first opening and said second opening, respectively, attaching the panel section to the frame attachment section;
    the mounting member of the second mount positioning the panel section substantially perpendicular with respect to the frame attachment section.

2. The attachment system of claim 1, wherein:
    said panel section comprises a first pair of male attachment members;
    said first male attachment member is one of said first pair of male attachment members; and
    said female keyway mounting bracket has a first pair of openings positioned to receive said first pair of male attachment members.

3. The attachment system of claim 2, wherein
    the mounting member of said second mount comprises a cross-bar having a second pair of male attachment members, and a vertical bar extending perpendicular from said cross-bar, said vertical bar having a fastener attached to the frame attachment section, and said second male attachment member being one of said second pair of male attachment members, said female keyway mounting bracket having a second pair of openings positioned to receive said second pair of male attachment members.

4. The attachment system of claim 3, wherein:
    said cross-bar of said second mount further comprises a bracket for gripping the frame attachment section.

5. A method for coupling a panel section to a frame attachment section, the panel section comprising a first elongated plate and a second elongated plate defining a linear gap therebetween, the method comprising:
    providing a first mount coupled to the panel section, said first mount comprising a first male attachment member with a disc shaped head;
    providing a second mount coupled to the frame attachment section, said second mount comprising a second male attachment member with a disc shaped head coupled to a mounting member;
    providing a female keyway mounting bracket having a first opening with a wide end and a tapered end, a second opening with a wide end and a tapered end, and a u-shaped section extending into said linear gap of said panel section;
    inserting said first male attachment member into said wide end of said first opening, and sliding said first male attachment member towards said tapered end of said first opening; and
    inserting said second male attachment member into said wide end of said second opening, and sliding said second male attachment member towards said tapered end of said second opening, the mounting member of the second mount positioning the panel section substantially perpendicular with respect to the frame attachment section.

6. The method of claim 5, wherein:
    said panel section comprises a first pair of male attachment members;
    said first male attachment member is one of said first pair of male attachment members; and
    said female keyway mounting bracket has a first pair of openings positioned to receive said first pair of male attachment members.

7. The method of claim 5, wherein
    the mounting member of said second mount comprises a cross-bar having a second pair of male attachment members, and a vertical bar extending perpendicular from said cross-bar, said vertical bar having a fastener attached to the frame attachment section, and said second male attachment member being one of said second pair of male attachment members, said female keyway mounting bracket having a second pair of openings positioned to receive said second pair of male attachment members.

8. The method of claim 7, wherein:
    said cross-bar of said second mount further comprises a bracket for gripping the frame attachment section.

* * * * *